July 30, 1940.   F. CASSEN ET AL   2,209,764
DETERMINATION OF PERCENTAGE OF ALCOHOL IN WATER-ALCOHOL SOLUTIONS
Filed Dec. 13, 1937
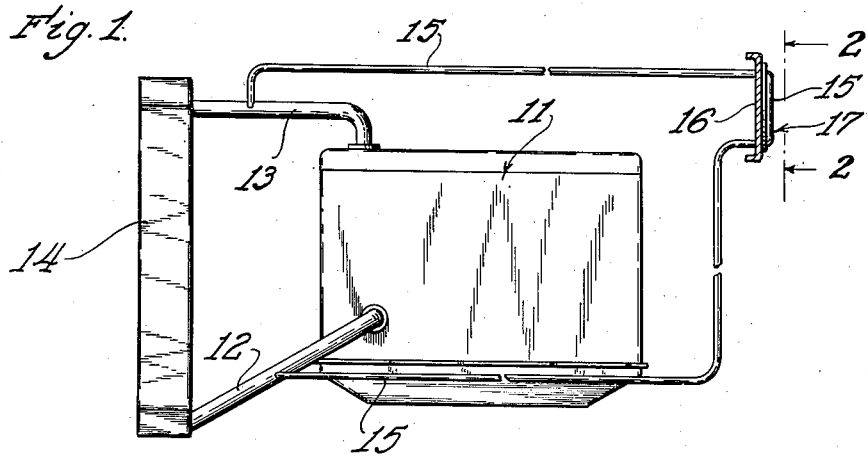
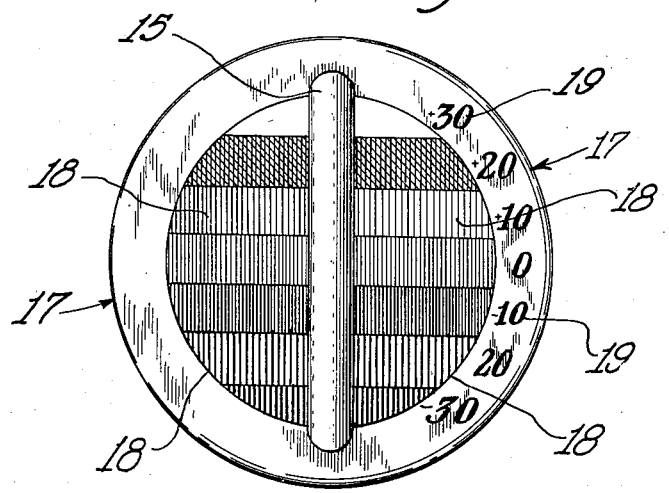
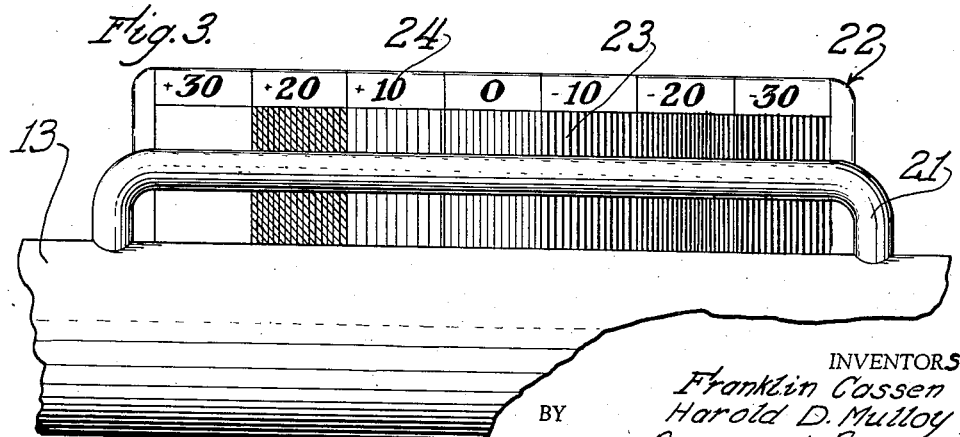
INVENTORS
Franklin Cassen
Harold D. Mulloy
BY Rasmussen & Brugman
ATTORNEYS Patented July 30, 1940

2,209,764

UNITED STATES PATENT OFFICE 2,209,764

DETERMINATION OF PERCENTAGE OF ALCOHOL IN WATER-ALCOHOL SOLUTIONS

Franklin Cassen and Harold D. Mulloy, Chicago, Ill.

Application December 13, 1937, Serial No. 179,468

9 Claims. (Cl. 88—14)

This invention relates in general to a method of determining the per cent of alcohol in a water-alcohol solution, and has more particular reference to the use of such method in determining the per cent of alcohol in the cooling system of an automobile engine.

A principal object of the invention is the provision of a novel method for determining the percentage of alcohol in a water-alcohol solution which incorporates the use of a water-insoluble, alcohol-soluble dye which is added to the solution and indicates the per cent of alcohol therein by the resulting intensity of color thereof.

A further important object of the invention is the use of a graduated color chart in conjunction with means for carrying at least a part of the solution therepast to enable a visual comparison between the color of the solution and the chart to determine certain desired characteristics of the solution which are dependent upon the per cent of alcohol therein.

More particularly, the object of the instant invention is to provide a method whereby the freezing temperature of a water-alcohol mixture may be easily and rapidly ascertained by visual inspection.

Another important object of the invention is the provision of a method which will enable alcohol to be used in the cooling system of a motor vehicle without the usual attendant disadvantages, such as the difficulty of accurately ascertaining the freezing temperature of the cooling fluid, and so that it may be used competitively with some of the better known and more expensive anti-freeze solutions.

Numerous other objects and advantages of the invention will be apparent as it is better understood from the following description, which, when taken in connection with the accompanying drawing, discloses a preferred embodiment thereof.

In the drawing,

Figure 1 is a side elevational view of one form of apparatus adapted to be used in the practice of the instant invention in conjunction with a motor vehicle cooling system;

Figure 2 is an elevational view of the comparator mechanism employed in Fig. 1, as viewed on the line 2—2 of Fig. 1; and Figure 3 is a view similar to Fig. 1 of a modified form of the apparatus of Fig. 1.

Referring more particularly to the drawing, reference numeral 11 indicates a motor block of a vehicle which includes the usual water jacket having inlet and outlet hose connections 12 and 13, respectively, to the radiator 14. A narrow tube 15 of any suitable material is connected at one end to the inlet hose connection 12, extends rearwardly through the usual dash board 16 of the vehicle, and then forwardly to the outlet hose connection 13. In this manner, a portion of the fluid in the cooling system of the motor 11 is continuously circulated through the tube 15 whenever there is the usual circulation of fluid through the cooling system. That portion of the tube 15 which is exposed to view to the rear of the dash board 16 is transparent for a purpose to be later more fully described.

The invention contemplates the addition to the fluid in the cooling system, which fluid is a water-alcohol solution of any desired proportions, of a water-insoluble, alcohol-soluble dye in such proportion that an excess of the dye is present. The purpose of this dye is to produce a variable color or a variable intensity of color of the solution used in the cooling system which is in direct proportion to the per cent of alcohol in the solution. A dye which has been found to be suitable for this purpose is di-phenyl-thiocarbazone. With an excess of this particular dye present, a red-green fluorescent color will result in dilute alcohol solutions. As the percentage of alcohol increases, the fluorescent characteristics disappear, and the solution changes from a light red color to darker shades of red. The color of the water-alcohol solution with an excess of this dye present is governed only by the amount of alcohol in the mixture, and not by the amount of dye employed. The dye also has the additional necessary characteristic of reversibility. This results in the same color indication being given for a particular percentage of alcohol in the water-alcohol solution regardless of whether that percentage is obtained by reduction in the original amount of alcohol present by boiling away or the like, or by addition of alcohol to the solution.

In order to advantageously employ the color characteristics resulting from the addition of the desired dye to the water-alcohol solution of the cooling system of the motor 11 to most easily ascertain the per cent of alcohol in the solution, a color chart 17 is mounted on the dash board 16 (Figs. 1 and 2) directly behind the transparent portion of the tube 15 and extending to either side thereof. This chart is graduated vertically in a series of horizontally disposed colored strips 18, as shown more specifically in Fig. 2. Each of these strips 18 is colored to correspond with the resulting color of the water-alcohol solution of the cooling system when a certain predetermined per cent of alcohol is present therein, as above described. Since each such percentage of alcohol will result in a particular freezing temperature of the solution, such freezing temperature is indicated on the chart 17 by means of numerals 19, inscribed adjacent the ends of their associated strips 18 on the marginal portion of the chart. In this manner, each graduation of color, as represented by the strips 18, is calibrated to the freezing temperature of the water-alcohol mixture (which is governed by the per cent of alcohol therein), as shown by the color of the mixture resulting from the addition thereto of an excess of the di-phenyl-thio-carbazone, or any other suitable dye.

It will thus be seen, in view of the above description, that in order to determine the freezing temperature of the water-alcohol solution in the cooling system of a motor vehicle, it is only necessary to visually compare the colored fluid of the cooling system which is circulating through the tube 15 with the several strips 18 on the colorimetric chart 17. Visual selection of that strip 18 which is of the same color as the fluid circulating through the tube 15 will give an immediate indication of the freezing temperature of the fluid in the cooling system of the motor. In this way, it is not necessary to periodically check the freezing temperature of the fluid in the cooling system by use of additional equipment, such as an hydrometer, and the driver of the vehicle may quickly determine at any time the freezing temperature of the fluid in the cooling system by merely glancing at the exposed portion of the fluid in the tube 15 in conjunction with the colorimetric chart 17.

The modified apparatus disclosed in Fig. 3 is somewhat more simple of installation than that above described, and comprises a substantially U-shaped tube 21 which is connected at each end in any suitable manner to longitudinally spaced portions of the outlet hose connection 13 of the cooling system. A substantially rectangular colorimetric chart 22 is vertically disposed directly adjacent and behind the tube 21. The chart 22 is graduated in vertically disposed colored strips 23 similar to the strips 18 of the chart 17. Inscribed upon the chart 22 adjacent the upper end of each of the strips 23, is a suitable numeral 24 which indicates the freezing temperature of the fluid of the cooling system when the latter has a color which corresponds to that of the associated strip 23. This particular installation of Fig. 3 has the advantage over that of Fig. 1 of being less expensive to manufacture and install. However, it has the disadvantage in comparison to that of Fig. 1 of necessitating the lifting of the engine hood in order to inspect the chart 22 to determine the freezing temperature of the fluid in the cooling system.

In addition to the di-phenyl-thio-carbazone above referred to, the invention contemplates the use of any other suitable dye. For example, any suitable oil-soluble dye may be used which will produce the desired results. This type of dye will necessitate the use of a solvent in conjunction therewith. The solvent must have the characteristics of being insoluble in water, soluble in alcohol, heavier than water, of having a boiling point which is not less than that of water so that it will not boil away, and of not undergoing any decomposition which would have a corrosive effect upon the various metal and other parts of the cooling system or radiator of a vehicle. Any solvent that has these characteristics will be adaptable for the desired purpose, and will enable the use of any desired selected color, such as red, blue, green and brown, etc.

A particular example of a suitable solvent is methyl salicylate, commonly known as synthetic oil of wintergreen. It will be readily understood that this solvent need not be chemically pure in order to be adaptable to the present use. Any suitable vat dye can be used with the methyl salicylate as a solvent. For example, if it is desired to obtain a red color, thio-indigo red, thio-indigo scarlet G or ciba-scarlet G may be employed. Similarly, hydron-blue, or hydron-blue R may be used to obtain a blue color, and ciba-green will give a resulting green color.

The selected dye is first dissolved in the solvent to a sufficient extent to result in a very deep color, preferably one that is so dark as to be almost black. In other words, the solvent is first saturated with the dye. This resulting dye solution is then added to the solution of the cooling system, or any other water-alcohol solution, the percentage of alcohol in which it is desired to ascertain. Due to the high specific gravity of the combined solvent and dye, this dye solution will settle to the lowest point in the cooling system when the latter is inactive. If there is only water and no alcohol in the cooling system, there will be no resulting color given to the fluid of the cooling system. Any alcohol in the fluid of the cooling system, however, will result in partial solution of the solvent by the alcohol, along with the dye, to result in what might be called solution equilibrium. In other words, any alcohol present in the fluid of the cooling system will extract a certain amount of the solvent from the solvent-dye solution along with a comparable amount of the dye, the quantity of which will depend upon the percentage of alcohol present in the fluid of the cooling system. This will result in the fluid of the cooling system having a particular shade of the selected color which is in direct proportion to the percentage of alcohol therein. The apparatus above described may then be employed to visually ascertain the freezing temperature of the water-alcohol solution.

The chemicals above recited also have the desired characteristic of reversibility, in that decreasing the percentage of alcohol in the cooling system in any manner will result in a precipitation of a portion of the solvent-dye solution from the water-alcohol solution of the cooling system which was previously in solution therewith and is in direct proportion to the difference between the percentage of alcohol which was previously present and the percentage of alcohol now present in the solution. The use of these vat dyes with the methyl salicylate or equivalent solvent has the distinct advantage of being extremely economical, so that the present method of determining the per cent of alcohol in a water-alcohol solution will enable the use of alcohol in the cooling system of a motor vehicle on a competitive basis with more expensive types of anti-freeze.

It is thought that the invention and many of its attendant advantages will be understood from the foregoing description, and it will be apparent that various chemicals can be employed other than those specifically enumerated, and that various changes may be made in the steps and their order of accomplishment of the processes described, without departing from the spirit and scope of the invention or sacrificing all of its material advantages, the processes hereinbefore described being merely preferred embodiments thereof.

We claim:

1. The method of determining the per cent of alcohol in a water-alcohol solution which comprises adding an excess of a water-insoluble, alcohol-soluble dye to the solution, and visually comparing the resulting color of the solution with the colors of similar solutions containing known percentages of alcohol.

2. The method of determining the percentage of alcohol in a water-alcohol solution, comprising adding to the solution an excess of a water-insoluble, alcohol-soluble dye which has the further characteristic of reversibility, and visually comparing the resulting color of the solution with the colors of similar solutions containing known percentages of alcohol.

3. The method of determining the per cent of a liquid in a solution containing a second liquid, comprising adding an excess of a dye to the solution which is soluble in said first liquid and insoluble in said second liquid, and visually comparing the resulting intensity of color of the solution with the intensities of color of similar solutions containing known percentages of said first liquid.

4. The method of determining the per cent of alcohol in a water-alcohol solution, comprising adding an excess of a water-insoluble, alcohol-soluble dye to the solution, continuously passing at least a part of the solution directly adjacent to a graduated color chart, the colors of which correspond with the colors of similar solutions containing known percentages of alcohol, and visually comparing the resulting color of the solution with the several colors on the chart.

5. The method of determining the freezing temperature of a water-alcohol solution, comprising adding an excess of water-insoluble, alcohol-soluble dye to the solution, visually comparing the resulting intensity of color of the solution with the intensities of color of similar solutions containing known percentages of alcohol, the freezing temperatures of which latter solutions are known, and from such comparison ascertaining the freezing temperature of the solution.

6. The method of determining the freezing temperature of a water-alcohol solution, comprising adding an excess of a water-insoluble, alcohol-soluble dye to the solution, visually comparing the resulting color of the solution with those of a color chart, the colors of which correspond with the colors of similar solutions containing known percentages of alcohol, and ascertaining the freezing temperature of the solution by determining the freezing temperature of such a solution having the particular color corresponding with that selected on the chart.

7. The method of determining the percentage of alcohol in a water-alcohol solution, which comprises adding an excess of di-phenyl-thio-carbazone to the solution, and visually comparing the resulting intensity of color of the solution with the intensities of color of similar solutions containing known percentages of alcohol.

8. The method of determining the per cent of alcohol in a water-alcohol solution, comprising saturating a water-insoluble, alcohol-soluble solvent with a dye, adding an excess of such solvent-dye solution to the water-alcohol solution, and visually comparing the resulting color of the latter solution with the colors of similar solutions containing known percentages of alcohol.

9. The method of determining the per cent of alcohol in a water-alcohol solution, comprising saturating methyl salicylate with a vat dye, adding an excess of said methyl salicylate-vat dye solution to the water-alcohol solution, and visually comparing the resulting color of the latter solution with the colors of similar solutions containing known percentages of alcohol.

FRANKLIN CASSEN.
HAROLD D. MULLOY.